United States Patent [19]

van der Lely

[11] 4,415,888
[45] Nov. 15, 1983

[54] MONITORING DEVICE FOR MACHINE PARTS

[76] Inventor: Cornelis van der Lely, 7, Brüschenrain, Zug, Switzerland

[21] Appl. No.: 221,032

[22] Filed: Dec. 29, 1980

Related U.S. Application Data

[63] Continuation of Ser. No. 4,539, Jan. 18, 1979, abandoned.

[30] Foreign Application Priority Data

Jan. 20, 1978 [NL] Netherlands ............. 7800715

[51] Int. Cl.³ ............................................. G08B 21/00
[52] U.S. Cl. ..................................... 340/684; 56/10.2; 56/DIG. 15; 324/179
[58] Field of Search ............. 340/671, 679, 680, 682, 340/684; 73/572, 593, 462; 172/111, 430; 324/167, 179; 56/10.2, DIG. 15

[56] References Cited

U.S. PATENT DOCUMENTS

| | | | |
|---|---|---|---|
| 2,805,677 | 9/1957 | Baird | 340/682 X |
| 3,505,595 | 4/1970 | Favre | 340/671 X |
| 3,583,405 | 6/1971 | Gerhardt et al. | 340/671 X |
| 3,710,246 | 1/1973 | Herring | 324/179 X |
| 3,765,491 | 10/1973 | van der Lely et al. | 172/111 X |
| 3,807,238 | 4/1974 | Chombard | 340/671 X |
| 3,921,159 | 11/1975 | Steffen | 340/671 |
| 4,003,046 | 1/1977 | Jordan et al. | 340/684 X |
| 4,008,464 | 2/1977 | Hobbie | 340/682 X |
| 4,028,686 | 6/1977 | Wilson et al. | 340/671 X |
| 4,167,734 | 9/1979 | Logan et al. | 340/682 |
| 4,257,040 | 3/1981 | Shirasaki et al. | 340/671 |

FOREIGN PATENT DOCUMENTS

705553  3/1965  Canada ............................. 340/682

Primary Examiner—Glen R. Swann, III
Attorney, Agent, or Firm—Penrose Lucas Albright

[57] ABSTRACT

A machine has two relatively movable portions and relative movement between the portions is sensed by means generating an electric current. In the preferred embodiment this means comprises a permanent magnet on one portion and an induction coil and a soft-iron core on the other portion. The two portions are parts of an overload coupling interconnected with a shear pin. When the coupling is overloaded, a shear pin fractures and the two portions rotate relative to one another. This causes a current to be generated in the coil which actuates a signal element. The device provides a visual indication of the operative condition of the two portions.

11 Claims, 6 Drawing Figures

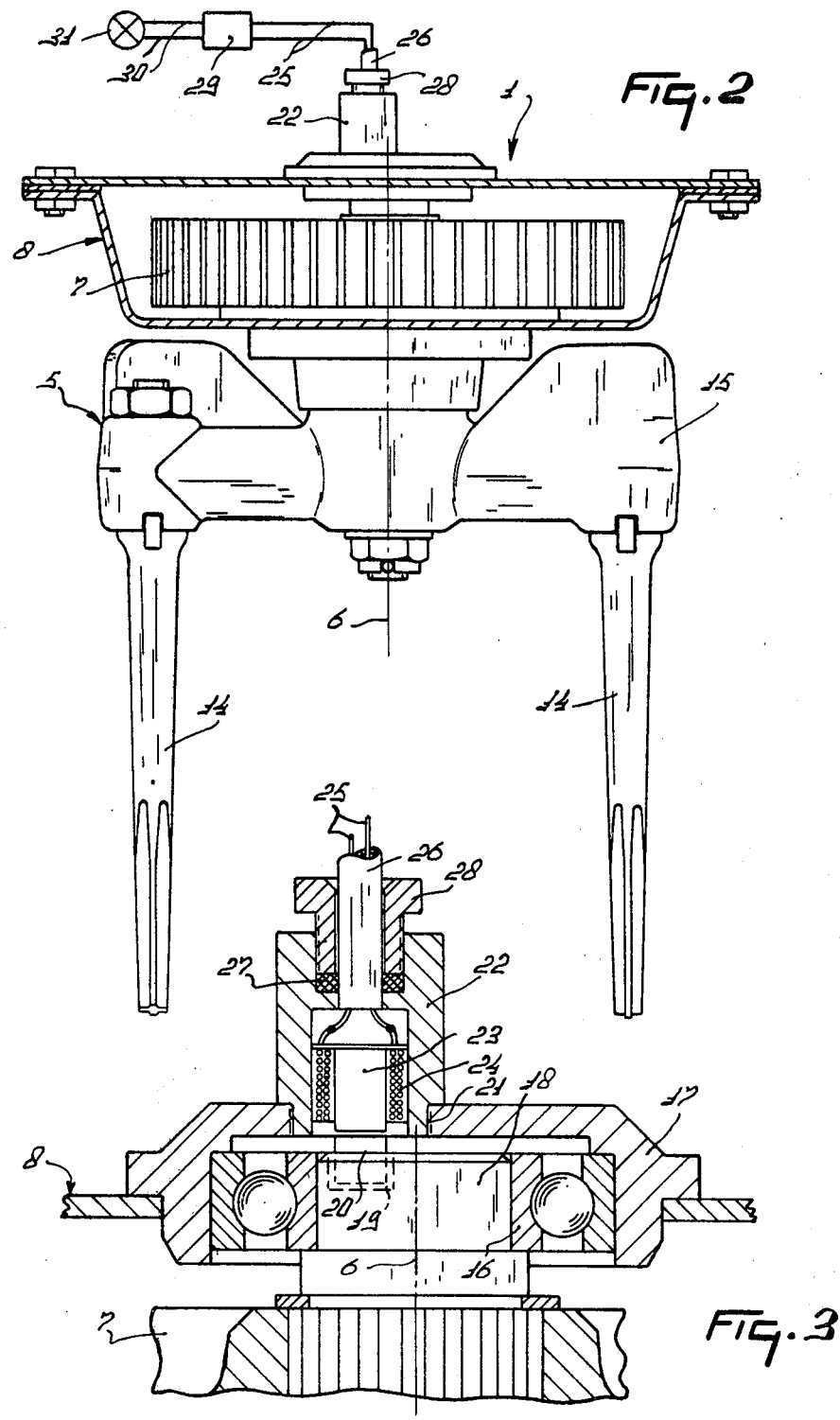

MONITORING DEVICE FOR MACHINE PARTS

This is a continuation of Ser. No. 004,539, filed Jan. 18, 1979 now abandoned.

SUMMARY OF THE INVENTION

According to a first aspect of the present invention there is provided a machine comprising two portions which are movable relatively to one another, at least in one operative condition of the machine, the machine including a device for remotely indicating relative movement of the two portions during operation, this device comprising means for the independent generation of an electric current for supplying a signal to a signalling element to indicate the operative condition of the two portions.

According to a second aspect of the present invention there is provided a machine comprising a device for remotely checking, during operation, the operative condition of two portions which are movable relatively to one another, the device comprising a signalling element arranged in a shear pin coupling for checking the discharge of a broken-off fragment of a broken shear pin.

For a better understanding of the present invention and to show how it may be carried into effect, reference will now be made by way of example only to the accompanying drawings, in which:

BRIEF DESCRIPTION OF THE DRAWINGS

FIG. 2 is an enlarged sectional view taken along the line II—II of FIG. 1;

FIG. 3 is a sectional view of a part of the machine shown in FIG. 1, illustrating a device for indicating the operative state of the machine;

DESCRIPTION OF THE PREFERRED EMBODIMENTS

Figure 1:
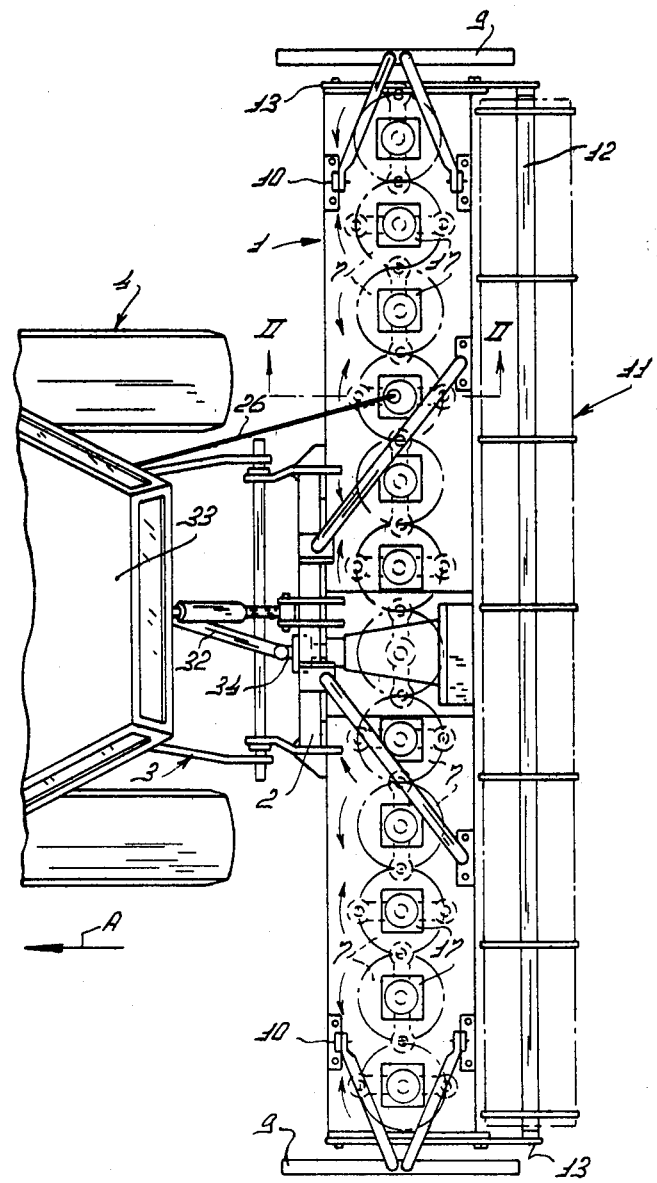
FIG. 1 is a plan view of an agricultural machine.

The agricultural machine shown in FIG. 1 comprises a rotary harrow 1, which is hitched by means of a trestle 2 to the three-point lifting device 3 of a tractor 4. Although the present invention will be described in connection with the rotary harrow 1, it is also applicable to other machinery, whether or not it is agricultural machinery. The rotary harrow 1 has a row of tools 5 (FIG. 2) extending transversely in the intended direction of operative travel A of the harrow. Adjacent tools rotate, in operation, in opposite senses about rotary axes 6 and are driven by pinions 7 arranged in a gear box 8 and also rotatable about the axes 6. The gear box 8 serves, in addition, as a supporting member for the tools 5. At the ends of the gear box 8 there are side plates 9 which are pivotable about substantially horizontal pivotal axes 10 extending parallel to the direction A. The axes 10 are disposed at a distance from the ends of the gear box and are situated above the gear box 8. A roller 11 is mounted at the rear of the gear box 8 for rotation about a shaft 12, which is connected by plates 13 to the ends of the gear box 8.

As shown in FIG. 2, each tool 5 comprises two harrow tines 14, which are arranged on a common carrier 15 and are disposed diametrically opposite one another on each side of the axis 6. The carrier 15 is mounted directly beneath the lower side of the gear box 8 for rotation about the axis 6. At the top side of the gear box 8, an upper end portion 18 (FIG. 3) of a shaft coaxial with the axis 6 is journalled in a ball bearing 16, which is arranged in a bearing housing 17 fastened to the top side of the gear box 8. An axially extending bore 19 is provided in the end portion 18 at a distance from the axis 6 to form a recess (FIG. 3). In this recess is fixed, for example by cementing, a permanent magnet 20. The permanent magnet 20 is preferably located as far from the rotary axis 6 as possible.

As shown in FIG. 3, the bearing housing 17 has a tapped opening 21, into which is screwed a housing 22 of substantially H-shaped axial cross-section. The housing 22 accommodates a soft-iron core 23, the lower end of which is shown to be adjacent the part of the permanent magnet 20 projecting above the end portion 18; the core 23 and the magnet 20 will not always be opposite one another, since the magnet 20 is rotating about the axis 6 during operation. The soft-iron core 23 is surrounded by an induction coil 24 having a large number of turns connected to two wires 25, which are enclosed in a sheath 26 projecting inwardly from the housing 22. The sheath 26 is fixed in place with respect to the housing 22 by means of a packing ring 27 which is compressed by a cap nut 28. The wires 25 are connected to a voltage limiter 29, for example a Zener diode, which also serves to rectify the current generated in operation by the dynamo constituted by the members on the stationary and the rotatable parts of the tool. After the voltage limiter 29 the current is supplied through wires 30 to a signalling member 31 constituted in this embodiment by an LED (light-emitting diode). This signalling member is situated within the field of view of a driver of the tractor 4.

During operation the harrow 1 is moved across the ground in the direction A in FIG. 1. The tools 5 are driven through an auxiliary shaft 32 from the power take-off shaft of the tractor. As is shown in FIG. 1, a dynamo is arranged above one of the pinions 7 so that rotation of that tool results in the independent generation of an electric current. The dynamo becomes operative in this embodiment as soon as the tractor driver actuates the power take-off shaft. Owing to the voltage limiter 29, the LED 31 connected to the dynamo is substantially insensitive to variations of the speed of the tools. While the tools rotate normally, the LED 31 will be lit so that the tractor driver gets a visual indication of the rotation of the tools 5. If the speed of the tools drops below a given limit the LED goes out. This visual indication is particularly advantageous if a direct check of the operation of the tools by the tractor driver is difficult, for example, from the tractor cabin 33 shown. Such a check may even not be possible at all, for example when a combination of agricultural implements is employed so that the tools and the driver are a long way apart.

The disposition of the dynamo is, in this embodiment, fairly arbitrary, if an auxiliary shaft 32 with an overload safety coupling is used, and the coupling is overloaded, each pinion 7 would come to a standstill, so that the signalling member 31 would go out. However, if it is desired to check the correct transmission of power through all of the pinions 7, it may be advantageous to dispose the dynamo on one of the tools located at the side of the machine. It is convenient if there is a connection between the wires 30 and the wiring system of the tractor so that when no current is generated by the dynamo a second signalling lamp lights, so indicating the overload.

Figure 4:
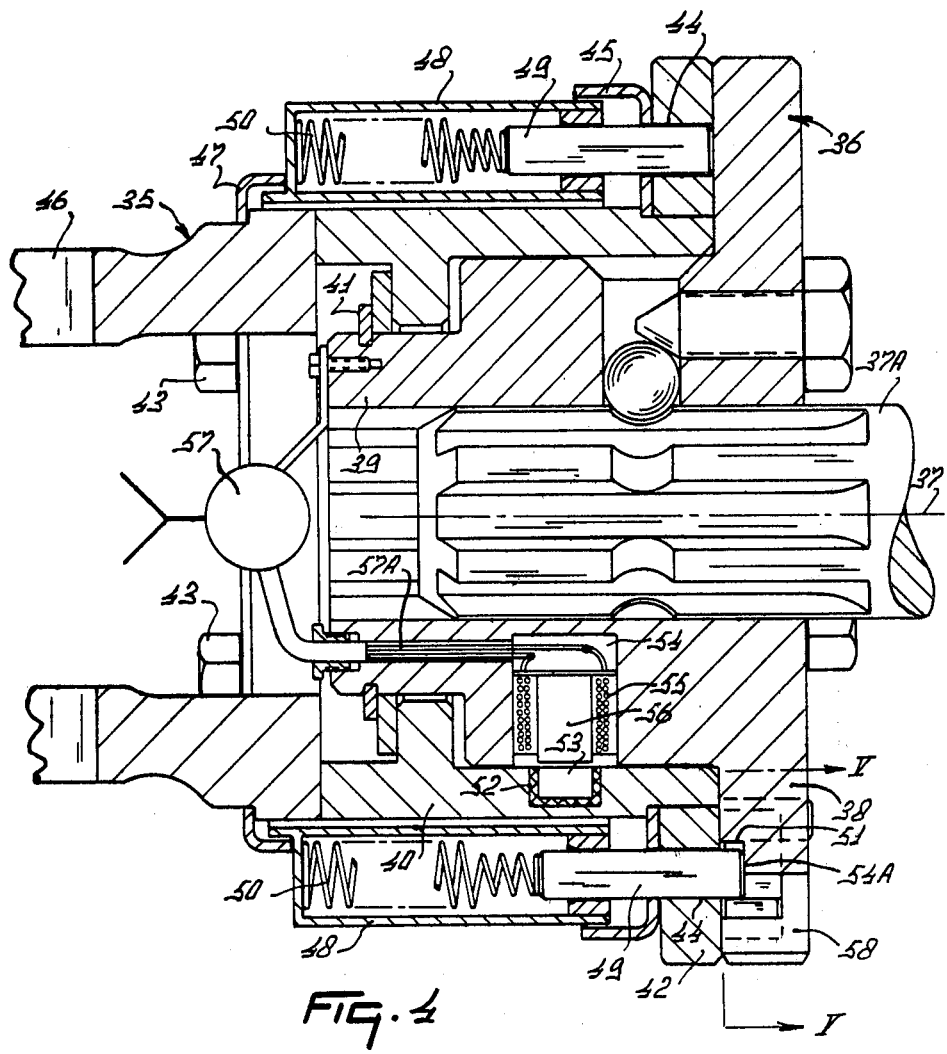
FIG. 4 is a sectional view of another part of the machine illustrating a second embodiment of device for indicating the operative state of the machine.

In the second embodiment shown in FIG. 4, the device is arranged in a terminal portion 34 of the auxiliary shaft 32 (FIG. 1). This terminal portion comprises a shear pin coupling having a first coupling portion 35 and a second coupling portion 36, which portions rotate in normal operation about a common rotary axis 37. The coupling portion 36 comprises a radially extending flange 38 and a hub 39 provided with retaining means in the form of a ball and a screw for axially fixing the coupling portion 36 on an input shaft 37A of the agricultural machine 1. The coupling portion 35 includes a carrier 40 which is coaxial with the hub 39. The coupling portion 35 is held axially with respect to the coupling portion 36 by means of inter alia a retaining ring 41. The carrier is connected with a hard steel cutting ring 42, which is connected by axially extending bolts 43 with the rest of the coupling portion 35. The cutting ring 42 meets at one side the flange 38 and has a plurality of bores 44; in this embodiment there are ten. The cutting ring has furthermore a centering ring 45, and a second centering ring 47 is provided near a fork piece 46 which is connected to the carrier 40 and is part of a universal joint of the auxiliary shaft 32. The two centering rings 45 and 47 constitute securing means for two diametrically opposite holders or cassettes 48, each of which accommodates five shear pins 49. Each holder is arcuate and has for each pin 49 a compression spring 50. The compression springs 50 push the shear pins 49 towards the interface between the cutting ring 42 and the flange 38. One of the shear pins shown in FIG. 4 lies in a cavity 51 in the flange 38, and this shear pin therefore rigidly interconnects the two coupling portions 35 and 36 for rotation together.

The carrier 40 has a chamber 52, in which is cemented a permanent magnet 53. If desired, a number of permanent magnets 53 may be arranged in this way in a circle around the shaft 37. The hub 39 has a cavity 54 accommodating, as in the first embodiment, an induction coil 55 and a soft-iron core 56. The soft-iron core 56 preferably extends radially and has an outwardly extending, tangential boundary surface, which is adjacent the inner boundary surface of the magnet 53 in the position shown in FIG. 4. The wires of the coil 55 are connected by a lead 57A, if necessary through a voltage limiter (not shown), to a transmitter 57 of electro magnetic radiation which, in this embodiment, is an infra-red transmitter. In normal operation the two coupling portions 35 and 36 rotate together about the axis 37, since one of the shear pins 49 is in a connecting position in the cavity 54A. In the event of overload, the portion of the shear pin 44 located in the cavity 54A breaks off, and the broken-off fragment is passed out through a channel 58 (FIG. 5) in a radial direction. Owing to the fracture of the shear pin, the coupling portion 36 connected with the agricultural machine comes to a standstill, whereas the coupling portion 35 continues to rotate. As a result, the dynamo constituted by the coil 55, the soft-iron core 56 and the permanent magnet or magnets 53 will generate current which will be supplied to the infra-red transmitter 57. The transmitter 57 transmits a signal to an infra-red sensor arranged on the tractor, which passes the signal to the signalling element in the tractor cab as in the previous embodiment. In this way the tractor driver receives an immediate visual indication of an overload. An advantage of this device is that the electric current is produced by the device only in the event of overload, whereas in normal operation the device is not active. It will be obvious that the wire link 57A may, in an alternative embodiment, be connected by a sliding contact to the tractor so that the transmitter 57 can be omitted. The shear pin coupling shown is capable of re-establishing the coupling several times after successive overloads, preferably at least fifty times without the need for the tractor driver to leave his seat. In this coupling the signalling device shown is an effective measure enabling the tractor driver to monitor the drive to the machine.

Figure 5:
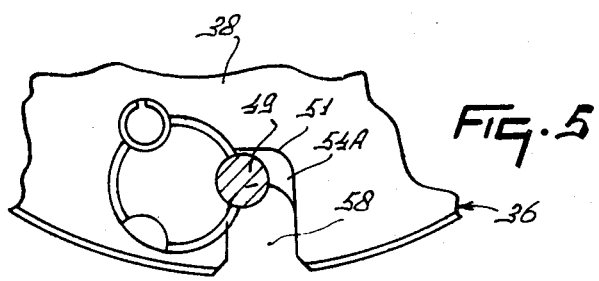
FIG. 5 is a sectional view taken on the line V—V in FIG. 4.
Figure 6:
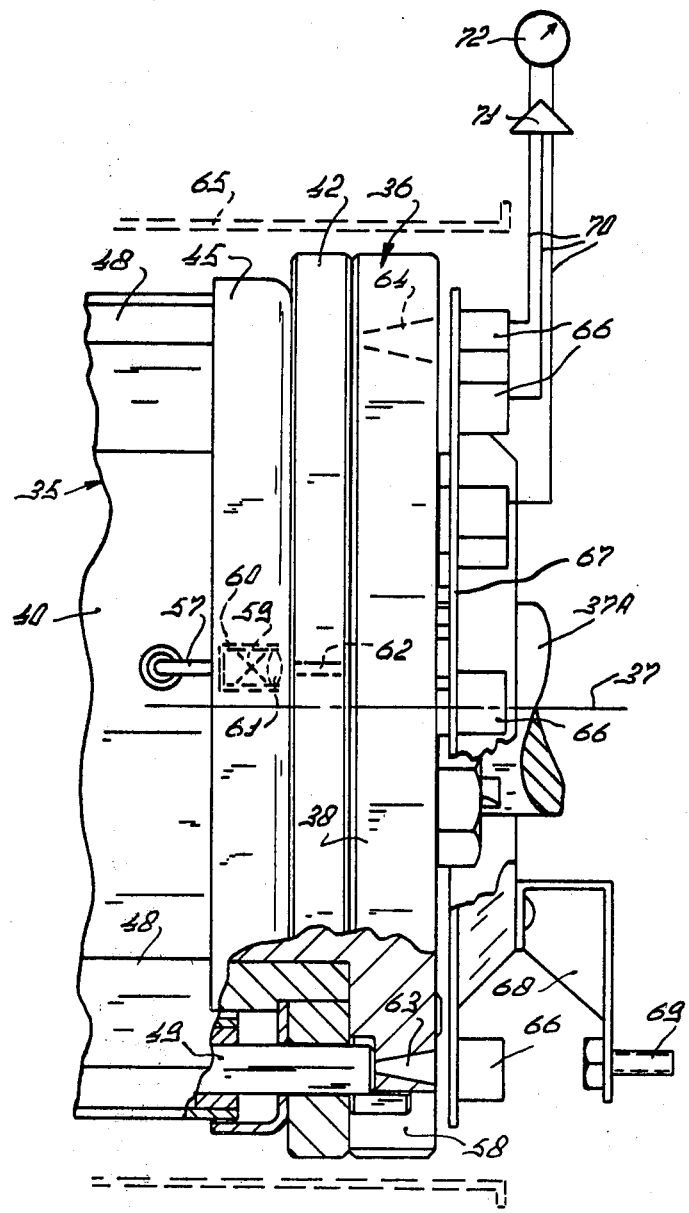
FIG. 6 is a partly sectioned, elevation of part of the agricultural machine of FIG. 4 illustrating a third embodiment of device for indicating the operative state of the machine.

In the embodiment shown in FIG. 6 the positions of the abovementioned coil 55 and the magnet 53 are interchanged so that the coil 55 is mounted on the carrier 40. The coil 55 is coupled with a light source 59, in a housing 60 provided with a lens 61, so that a sharply defined light ray is emitted. The light source 59 is arranged near the circumference of the coupling adjacent the centering ring 45 in the region between the two holders 48. The housing 60 is opposite an axial bore 62 in the cutting ring 42. The opening thus formed is at the same radial distance from the rotary axis 37 as an opening 63 in the bottom of the cavity 51. This opening 63 extends axially and flares in the direction away from the bottom of the cavity 51 to open out at the side of the flange 38 away from the cutting ring 42. Diametrically opposite the opening 63 there is a second opening 64, which is preferably located at the same distance from the rotary axis 37. The shear pin coupling is furthermore surrounded by a hood 65 which extends axially beyond the flange 38 for avoiding spurious incidental light. Adjacent the flange 38 there is a receiver comprising a plurality of photo-electric cells 66 disposed in a ring and arranged on a carrier 67, which is rigidly fastened by supports 68 and a bolt 69 to the frame of the agricultural machine. The photo-electric cells 66 are connected by leads 70 to an amplifier 71, which is powered by the electric system of the tractor and which supplies signals to a signalling member constituted by a meter 72. As in the embodiment of FIGS. 4 and 5, overload during operation results in fracture of the shear pin, and the inductor 55 then generates current to light the light source 59 which emits a light ray through the lens 61 across the narrow bore 62. When, subsequent to overload, the coupling portion 36 comes to a standstill, the light beam in the bore 62 will pass intermittently through the apertures 63 and 64 owing to the rotation of the coupling portion 35. In dependence upon the position of the coupling portion 36 this light beam intermittently actuates one of the photo-electric cells located opposite the apertures 63 and 64 after the portion 36 has come to a standstill. The photo-electric cell 66 concerned converts the light pulses into low-current electric pulses which are amplified by the amplifier 71. The pulses are shaped and fed to the meter 72 which then deflects. The amplifier 71 and the meter 72 are preferably adjusted so that at the conventional speed of the power take-off shaft (540 and 1000 rev/min) the two pulses per revolution produce full-scale deflection. If connection is reestablished by one of the shear pins by reducing the speed in the manner disclosed in Dutch patent application No. 7701012 (British patent application No. 2945/78), the frequency of the pulses received by the photo-electric cell 66 will decrease so that the reading of the meter 72 drops. The meter 72 is preferably calibrated to indicate the desired maximum speed at which one of the shear pins can re-establish the connection. When this speed is reached, the tractor driver will know that the connection has been re-established so that he need not reduce the speed further. This may means saving of time in re-establishing the connection. The re-establishment of the connection can be monitored since at this instant the current generated by the coil 56 ceases and the reading of the meter 72 drops to zero. If, upon fracture, a fragment of the shear pin 44 should stick in the cavity 51, the light beam from the bore 62 will not reach the photo-electric cell 66 through the bore 63. As a result, the photo-electric cell 66 receives only one pulse per revolution and this signal amplified by the amplifier 71 produces only half of the normal full-scale deflection of the meter 72. Since it is thus clearly indicated to the tractor driver that re-establishment of the connection by further reduction of the speed is not possible, he knows that he must first remove the fragment of the shear pin from the cavity 51. In this manner the device described has a double function, namely the indication of an overload and the indication, as the case may be, of the successful removal of the shear pin fragment from the coupling and of the readiness to re-establish the connection.

It will be clear that in the embodiments of FIGS. 4 and 5 and of FIG. 6, the device may be employed with advantage when the shear pin coupling is disposed directly near the power take-off shaft. In this way the connection between the device and the tractor can be shortened.

Although various features of the devices described and illustrated in the drawings, will be set forth in the following claims as inventive features, the invention is not necessarily limited to these features and it encompasses all inventive features disclosed both individually and in various combinations.

Having disclosed my invention what I claim as new and novel to be secured by Letters Patent of the United States is:

1. A ground working machine comprising a frame, a portion of said frame mounting a plurality of soil working tools, driving means connected to rotate said tools about respective upwardly extending axes defined by corresponding shafts for said tools, monitoring means adjacent said driving means and said monitoring means including an electrical generating device in a circuit, said device independently generating electrical current to a signal element in said circuit responsive to the rotational movement of a said shaft of at least one of said tools, said shaft having an upper end journalled in a bearing supported by a bearing housing at the upper side of said frame portion, said device comprising two parts including an inductance part and a permanent magnet part, said magnet part being held in a bore in said upper shaft end and positioned off center with respect to the said axis of said shaft's rotation, said inductance part being mounted in the top of said bearing housing, located adjacent and above said upper shaft end, said inductance part being positioned off center with respect to the shaft axis of rotation whereby the rotational movement of said shaft relative to said inductance part generates a current during the normal rotation of said tool shaft and said signal element is actuated.

2. A machine as claimed in claim 1, wherein said bearing housing top and said shaft end are positioned closely adjacent one another and define an interface between them, said device being located at said interface.

3. A machine as claimed in claim 2, in which said interface is perpendicular to said axis of tool rotation.

4. A machine as claimed in claim 1 in which said tool is in a row of tools that are drivingly connected by meshed pinions and said pinions are mounted on respective said shafts of the tools.

5. A ground working machine as claimed in claim 1, wherein said frame portion mounts coupling means that is connectable to a prime mover.

6. A machine as claimed in claim 1 comprising a further housing which accommodates said induction part, said further housing being removably mounted above an opening in the top of said bearing housing.

7. A machine as claimed in claim 6 wherein said opening and the lower part of said further housing are provided with a corresponding threading, said opening's threading threadably receiving said further housing's threading.

8. A machine as claimed in claim 1 wherein said bearing is a ball bearing.

9. A ground working machine comprising a frame, a portion of said frame mounting a plurality of soil working tools, driving means connected to rotate said tools about respective upwardly extending axes defined by corresponding shafts for said tools, monitoring means adjacent said driving means and said monitoring means including an electrical generating device in a circuit, said device independently generating electrical current to a signal element in said circuit responsive to the rotational movement of a said shaft of at least one of said tools, said latter shaft having an upper end journalled in a bearing supported at the upper side of said frame portion, said device comprising two parts including an inductance part and a permanent magnet part, said magnet part being affixed to said upper shaft end and at least one of said magnet's poles being positioned off center with respect to the said axis of said latter shaft's rotation, said inductance part being mounted and located adjacent and above said upper shaft end and off center with respect to said latter shaft's axis of rotation whereby the rotational movement of said latter shaft and said one magnetic pole relative to said inductance part generates a current in said inductance part during the normal rotation of said latter shaft and said signal element is actuated.

10. A machine as claimed in claim 9 wherein said magnet part is held in a bore provided in said upper shaft end, the other pole of said magnet part being aligned with said one pole parallel to said latter shaft's axis of rotation.

11. A machine as claimed in claim 10 wherein said one pole projects above said upper shaft end.

* * * * *